US012293261B2

(12) United States Patent
Wu et al.

(10) Patent No.: US 12,293,261 B2
(45) Date of Patent: May 6, 2025

(54) K-LSTM ARCHITECTURE FOR PURCHASE PREDICTION

(71) Applicant: ROYAL BANK OF CANADA, Montreal (CA)

(72) Inventors: Yuanqiao Wu, Montreal (CA); Janahan Ramanan, Montreal (CA); Jaspreet Sahota, Montreal (CA); Cathal Smyth, Montreal (CA); Yik Chau Lui, Montreal (CA)

(73) Assignee: ROYAL BANK OF CANADA, Montreal (CA)

( * ) Notice: Subject to any disclaimer, the term of this patent is extended or adjusted under 35 U.S.C. 154(b) by 920 days.

(21) Appl. No.: 16/440,116

(22) Filed: Jun. 13, 2019

(65) Prior Publication Data
US 2019/0385080 A1      Dec. 19, 2019

Related U.S. Application Data
(60) Provisional application No. 62/684,545, filed on Jun. 13, 2018.

(51) Int. Cl.
*G06N 20/00* (2019.01)
*G06Q 30/0601* (2023.01)
(52) U.S. Cl.
CPC ......... *G06N 20/00* (2019.01); *G06Q 30/0631* (2013.01)

(58) Field of Classification Search
CPC ...... G06N 20/00; G06N 3/0445; G06N 3/084; G06Q 30/0631
USPC .......................................... 705/14.53; 706/12
See application file for complete search history.

(56) References Cited

U.S. PATENT DOCUMENTS

| | | | |
|---|---|---|---|
| 11,138,631 B1* | 10/2021 | Perevodchikov | G06N 20/20 |
| 2016/0180382 A1* | 6/2016 | Bhagwan | G06Q 30/0255 |
| | | | 705/14.53 |
| 2016/0232557 A1* | 8/2016 | McMullan | G06Q 30/0233 |
| 2016/0350652 A1* | 12/2016 | Min | G06N 3/044 |
| 2017/0127016 A1* | 5/2017 | Yu | G06N 3/084 |

OTHER PUBLICATIONS

Sangkil Moon, Predicting Product Purchase from Inferred Customer Similarity: An Autologistic Model Approach, 2008 (Year: 2008).*

* cited by examiner

*Primary Examiner* — Tarek Elchanti
(74) *Attorney, Agent, or Firm* — NORTON ROSE FULBRIGHT CANADA LLP

(57) ABSTRACT

A system receives transaction data over time, and creates structured data based on the received transaction data. Purchase transactions that are associated with a purchase category are identified in the structured data and labeled. A recurrent neural network such as a long short-term memory (LSTM) network, in particular, a k-LSTM architecture using weighted averages to update hidden states and cell states, is trained to build a model. The model is used to predict the likelihood of a purchase transaction.

9 Claims, 7 Drawing Sheets

500

| Day # | Merchant ID(s) | Purchase Amount |
|---|---|---|
| 0 | Walmart-123, Sobeys-456 | $123.45, $56.78 |
| 1 | | |
| 2 | Esso-876 | $46.57 |

FIG. 5

K-LSTM ARCHITECTURE FOR PURCHASE PREDICTION

CROSS-REFERENCE TO RELATED APPLICATIONS

This application claims priority from U.S. Provisional Patent Application No. 62/684,545 filed on Jun. 13, 2018, the contents of which are hereby incorporated by reference.

FIELD

This relates generally to the field of machine learning.

BACKGROUND

Machine learning is field of computer science that configures computing devices to process data using programming rules and code that can dynamically update over time. Machine learning involves programming rules and code that can detect patterns and generate output data that represents predictions or forecasting.

Traditionally, client historical data and deep learning models may be used to identify clients who have higher propensity to make purchases, such as for a vehicle, in the near term, for example, in the next one to six months.

However, client history can span many years, and events from the entire time span can contribute to predicting likelihood of purchase. Traditional neural network models suffer from long term memory loss.

Accordingly, there is a need to predict likelihood of purchase, taking into account long term client history.

SUMMARY

According to an aspect, there is provided systems and methods for machine learning purchasing forecasting and prediction, such as for automobile or vehicle purchasing.

According to an aspect, variations of LSTM (long short-term memory) recurrent neural network models are introduced, such as "kronos gate" LSTM ("k-LSTM"), in which LSTM hidden states and cell states are passed through "kronos gates" that are parameterized by k which acts as a toggle to preserve existing memory from previous time steps or update memory with current inputs.

In some embodiments, k may be constant over time. In some embodiments, k may be modulated based on inputs.

In some embodiments, k-LSTM may be able to handle long term input sequences or dependencies.

According to an aspect, there is provided a computer-implemented method for training a long short-term memory model, hidden states and cell states of the model having a toggle gate to preserve existing memory from previous time step or update memory with current inputs, the method comprising: receiving transaction data over time; creating structured data based on the transaction data; identifying transactions in the structured data that are associated with a purchase category; labelling the transactions associated with the purchase category; and training the model using the structured data and the labelled transactions.

In some embodiments, the method further comprises: receiving user transaction data associated with a user over time; for each time step in the time sequence of the user transaction data: inputting a current input from the user transaction data to the model for a current time step; updating a current hidden state for the current time step in the model, based on a weighted average of the hidden state at a previous time step and the hidden state at the current time step; updating a current cell state for the current time step in the model, based on a weighted average of the cell state at a previous time step and the cell state at the current time step; and performing non-linear transformations on the current hidden state, the current cell state and the current input; and predicting a likelihood of the user purchasing a product associated with the purchase category, using the model.

In some embodiments, the non-linear transformations comprise a forget gate layer, an input gate layer, and an output gate layer.

In some embodiments, the weighted average of the hidden state at the previous time and the hidden state at the current time is based on a constant value over time.

In some embodiments, the weighted average of the cell state at the previous time and the cell state at the current time is based on a constant value over time.

In some embodiments, the weighted average of the hidden state at the previous time and the hidden state at the current time and the weighted average of the cell state at the previous time and the cell state at the current time are based on a same constant value over time.

In some embodiments, the weighted average of the hidden state at the previous time and the hidden state at the current time is based on a value derived from a neural network.

In some embodiments, the weighted average of the cell state at the previous time and the cell state at the current time is based on a value derived from a neural network.

In some embodiments, the weighted average of the hidden state at the previous time and the hidden state at the current time and the weighted average of the cell state at the previous time and the cell state at the current time are based on a same neural network.

In some embodiments, the neural network comprises an architecture based at least in part on the current input, the previous hidden state, and time features.

According to another aspect, there is provided a non-transitory computer readable medium comprising a computer readable memory storing computer executable instructions thereon that when executed by a computer cause the computer to: predict a likelihood of a user purchasing a product associated with the purchase category, using a model trained using a method as described herein.

According to another aspect, there is provided a computer system comprising: a processor; a memory in communication with the processor, the memory storing instructions that, when executed by the processor cause the processor to: receive purchase transaction data associated with one or more first users over time; create structured data based on the purchase transaction data; identify purchase transactions in the structured data that are associated with a purchase category; label the transactions associated with the purchase category; use a recurrent neural network to build a model, using the structured data and the labels as training data; and predict a likelihood of a second user purchasing a product associated with the purchase category, using the model.

In some embodiments, the recurrent neural network comprises long short-term memory architecture.

In some embodiments, the memory further stores instructions that, when executed by the processor, cause the processor to: update a hidden state for a current time in the recurrent neural network, based on a weighted average of the hidden state at a previous time and the hidden state at the current time; and update a cell state for the current time in the recurrent neural network, based on a weighted average of the cell state at a previous time and the cell state at the current time.

In some embodiments, the weighted average of the hidden state at the previous time and the hidden state at the current time is based on a constant value over time.

In some embodiments, the weighted average of the cell state at the previous time and the cell state at the current time is based on a constant value over time.

In some embodiments, the weighted average of the hidden state at the previous time and the hidden state at the current time and the weighted average of the cell state at the previous time and the cell state at the current time are based on a same constant value over time.

In some embodiments, the weighted average of the hidden state at the previous time and the hidden state at the current time and the weighted average of the cell state at the previous time and the cell state at the current time are based on a same neural network.

In some embodiments, the same neural network comprises an architecture based at least in part on the current input, the previous hidden state, and time features.

In some embodiments, the purchase category is a vehicle purchase.

Other features will become apparent from the drawings in conjunction with the following description.

BRIEF DESCRIPTION OF DRAWINGS

In the figures which illustrate example embodiments,

FIG. 5 illustrates an example of a transaction sequence data structure for a client maintained by the software of FIG. 3, according to an embodiment;

DETAILED DESCRIPTION

Figure 1:
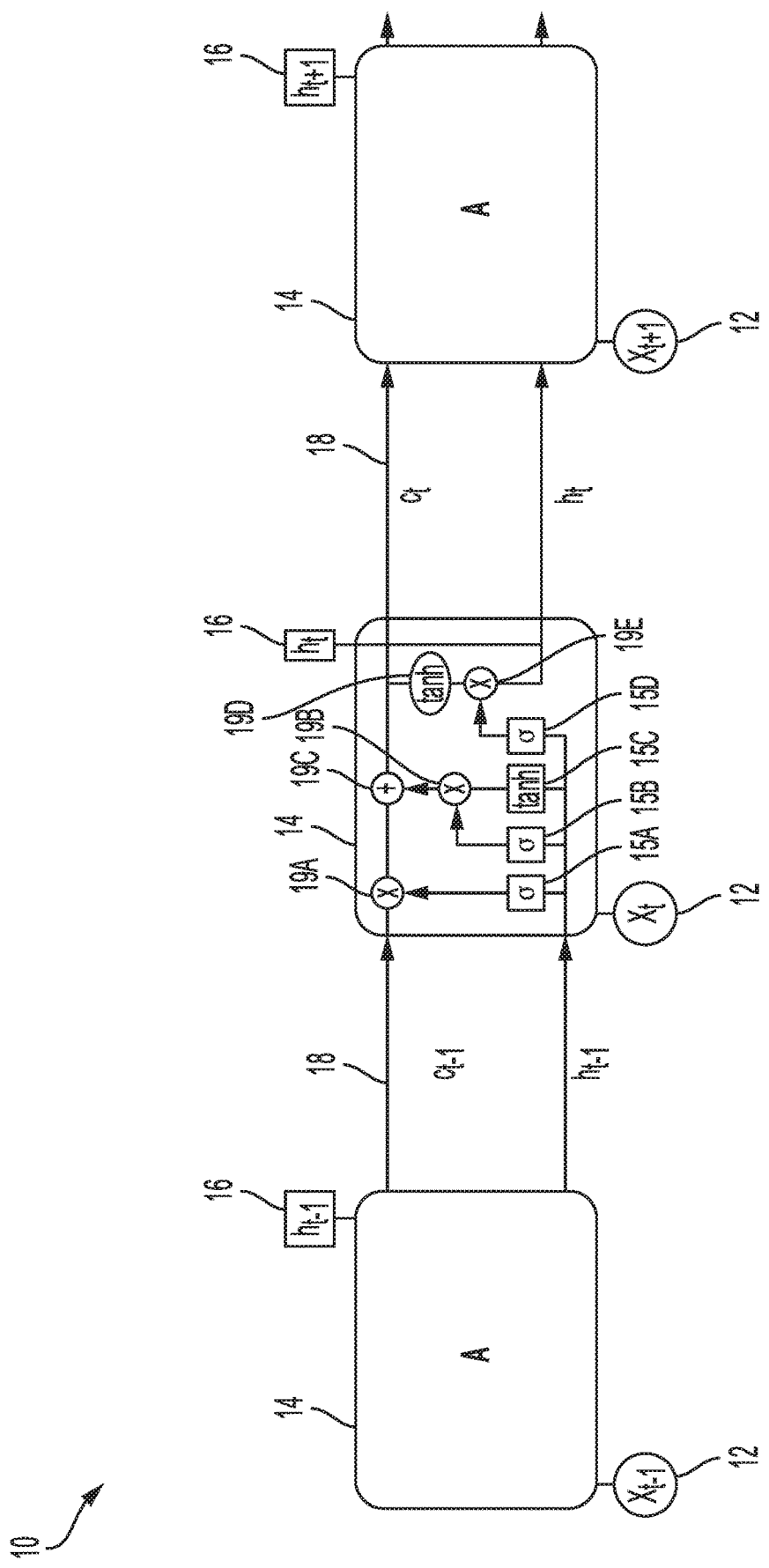
FIG. 1 is a schematic block diagram of an LSTM architecture.

FIG. 1 is a schematic block diagram of an LSTM architecture 10, and sequential processing in LSTM architecture 10.

In the example LSTM architecture 10 shown in FIG. 1, $X_t$ is sequence input 12 for a time step or time index t into a repeating module 14, labeled A as shown in FIG. 1. $h_t$ is sequence hidden state 16 for time t (also the network output), $c_t$ is sequence cell state 18 for time t, and σ and tan h are non-linear transformations, such as a sigmoid neural net layer, within module 14.

As seen in FIG. 1, module 14 contains four interacting neural network layers 15A, 15B, 15C, and 15D. Module 14 also includes pointwise multicpliation, addition, and tan h operations such as operations 19A, 19B, 19C, 19D, and 19E.

In some embodiments, module 14 performs mechanisms by way of gates composed of a sigmoid neural net layer and a pointwise multiplication operation. In some embodiments, module 14 includes three gates: a forget gate, an input gate, and an output gate, described in further detail below.

A forget gate considers inputs $h_{t-1}$ and $x_t$, which are multiplied by weight matrices and a bias is added. Following this, the sigmoid function σ at layer 15A is applied to this value and outputs a vector between 0 and 1 for each number in the cell state $c_{t-1}$. A 1 represents "keep entirely" while a 0 represents "discard entirely". This output is multiplied to the cell state via pointwise operation 19A.

An input gate considers inputs $h_{t-1}$ and $x_t$, a regulatory filter uses a sigmoid function σ at layer 15B, similar to the forget gate, and a tan h layer 15C creates a vector of new candidate values, that could be added to the state, and the value of the regulatory filter and the tan h function are multiplied together at pointwise operation 19B. This value is added to the cell state via addition pointwise operation 19C.

An output gate considers inputs $h_{t-1}$ and $x_t$, a regulatory filter uses a sigmoid function a at layer 15D, similar to the forget gate, and the cell state is put through tan h pointwise operation 19D to create a vector. The value of this regulatory filter and the vector of the cell state are multiplied at pointwise operation 19E, and this is the output and the hidden state of the next cell.

The recurrent nature of an LSTM architecture may allow information to persist over time.

Figure 2:
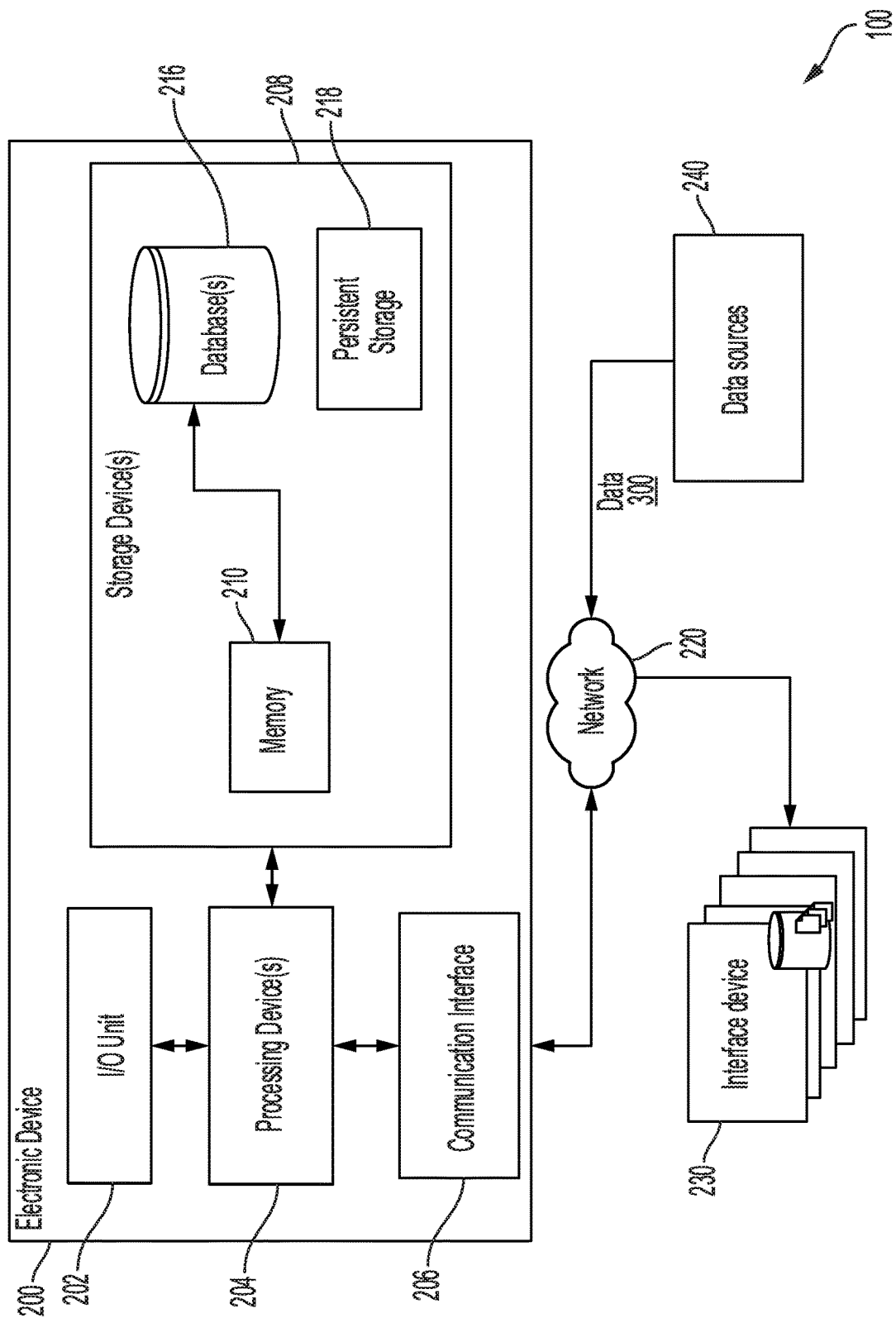
FIG. 2 is a schematic block diagram of a system for machine learning purchase forecasting, according to an embodiment.

FIG. 2 is a schematic block diagram of a system 100 for machine learning purchase forecasting. The system 100 has an electronic device 200 connected to interface device 230 and data sources 240 via network 220.

Figure 3:
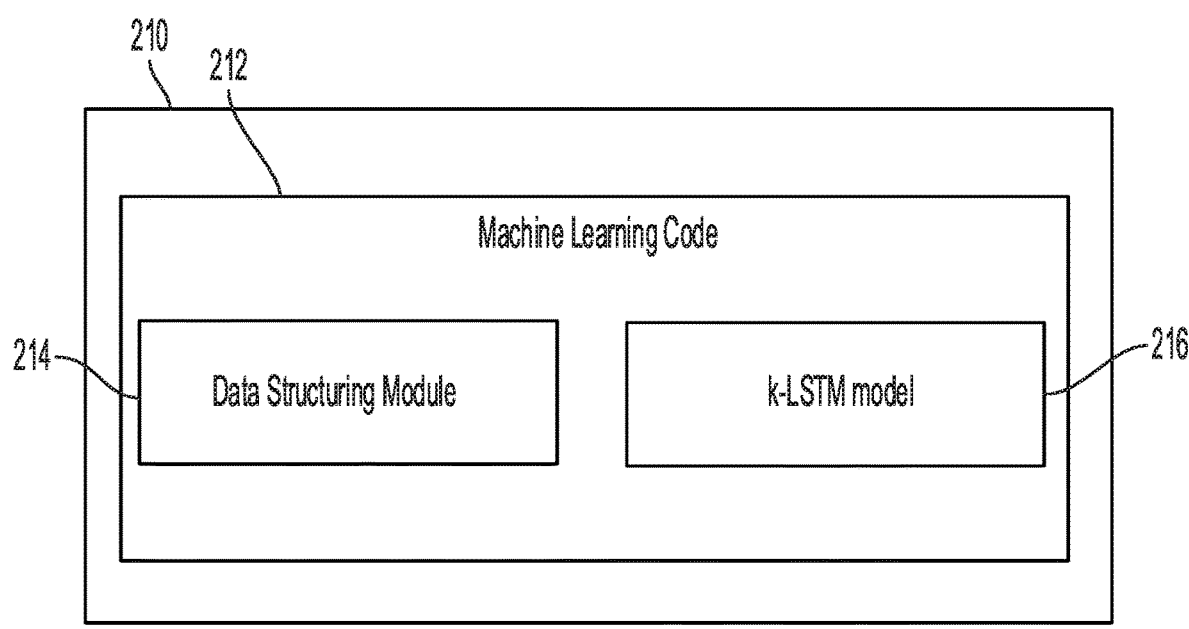
FIG. 3 illustrates the organization of software at the computing device of FIG. 2, according to an embodiment.

FIG. 3 depicts a simplified organization of example software components and data stored within memory 210 of electronic device 200. As illustrated, these software components include machine learning code 212 including data structuring module 214 and k-LSTM model 216.

The electronic device 200, for example, a computing device, can include an I/O unit 202, processing device(s) 204, communication interface 206, and storage device(s) 208. The electronic device 200 can connect with one or more interface devices 230 or data sources 240. This connection may be over a network 220 (or multiple networks). The electronic device 200 receives and transmits data from one or more of these via I/O unit 111. When data is received, I/O unit 111 transmits the data to processing device 112.

Each I/O unit 111 can enable the electronic device 200 to interconnect with one or more input devices, such as a keyboard, mouse, camera, touch screen and a microphone, and/or with one or more output devices such as a display screen and a speaker.

A processing device 204 can execute instructions (e.g., machine learning code 212) in memory 210 to configure electronic device 200. The processing device 204 can dynamically update machine learning code 212. A processing device 204 can be, for example, any type of general-purpose microprocessor or microcontroller, a digital signal processing (DSP) processor, an integrated circuit, a field programmable gate array (FPGA), a reconfigurable processor, or any combination thereof.

The storage device 208 can include memory 210, databases 216 and persistent storage 218. Memory 210 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 210 can include machine learning code 212 with data structuring module 214 and rules and models such as k-LSTM model 216. Machine learning code 212 can refine based on learning. Machine learning code 212 can include instructions to implement an artificial neural network, such as an RNN with LSTM nodes arranged in layers.

Each communication interface 206 can enable the electronic device 200 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

The electronic device 200 can be operable to register and authenticate users (using a login, unique identifier, and password for example) prior to providing access to applications, a local network, network resources, other networks and network security devices. The system 100 may serve one user or multiple users.

The storage device 208 may be configured to store information associated with or created by the machine learning code 212. Storage 208 and/or persistent storage 218 may be provided using various types of storage technologies, such as solid state drives, hard disk drives, flash memory, and may be stored in various formats, such as relational databases, non-relational databases, flat files, spreadsheets, extended markup files, etc.

Returning to FIG. 3, machine learning code 212 may include one or more submodules. As illustrated, in some embodiments, machine learning code 212 includes data structuring module 214 for structuring data from raw data sources 240 and use the structured data to train k-LSTM model 216.

Figure 4:
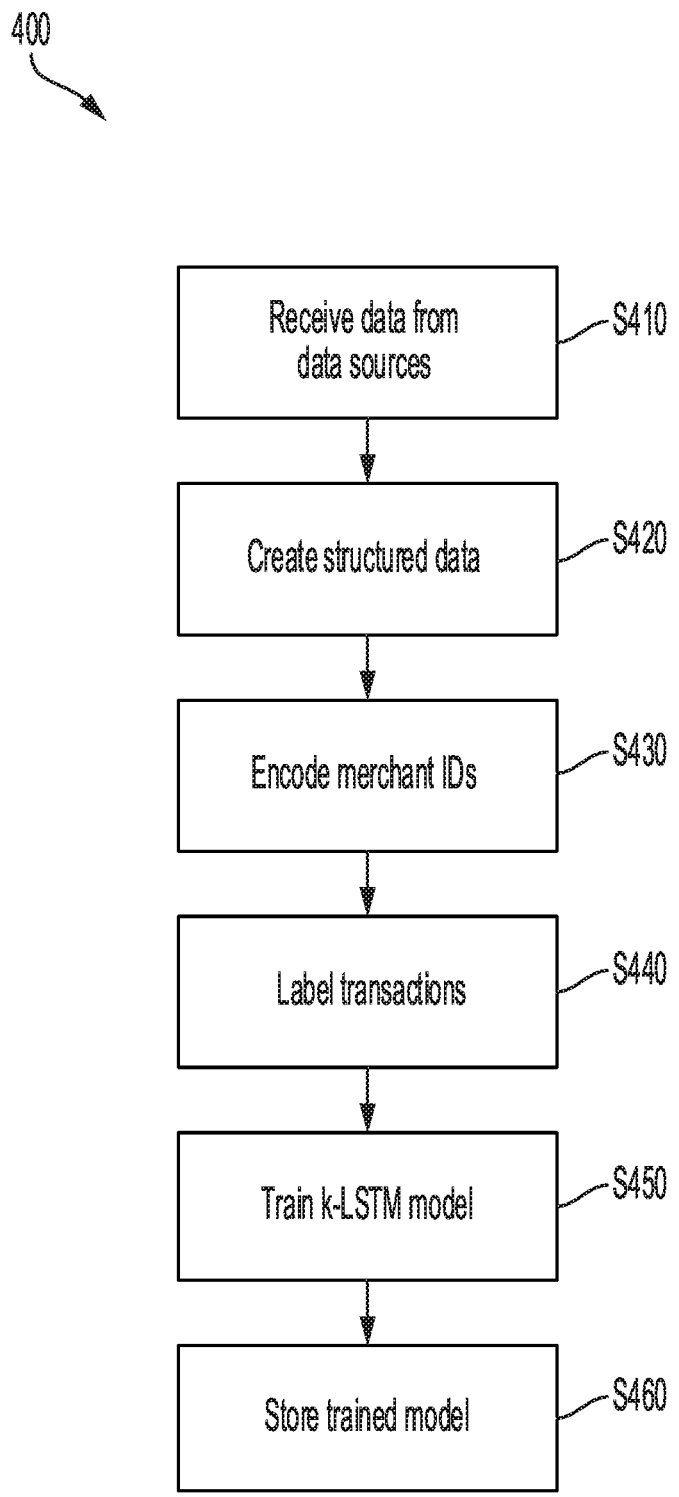
FIG. 4 is a flowchart of a process for machine learning purchasing forecasting, according to an embodiment.

The operation of machine learning code 212 is described in an embodiment with reference to the flowchart of FIG. 4. FIG. 4 is a flowchart of an example process 400 for machine learning purchasing forecasting implemented by system 100. Blocks S410 and onward are performed by processing device(s) 204 executing machine learning code 212 at electronic device 200.

Data structuring module 214 is called when data is collected to train k-LSTM model 216.

At block S410, processing device(s) 204 receive raw data 300, for example, from data sources 240 which may include raw data sources such as merchants or various financial institutions. Raw data 300 may be stored, for example in database(s) 216.

In some embodiments, raw data 300 may include, for each client of a number of clients, or user of a number of users, client transaction history and/or bureau information. Client transaction history may include, for example, each transaction event of a client spending with a merchant, including a merchant identification, a transaction amount, and a transaction time. The data included in a client transaction history may span multiple years.

In some embodiments, raw data 300 may include bureau information such as loan information or debt taken out by a client from various financial institutions, including a loan amount, current balance owing, scheduled payments and type of loan.

A block S420, processing device(s) 204 structure raw data 300, for example, by creating structured data of sequences at a particular level of temporal granularity, for example, by day, week, or month, to form a client transaction sequence. An example of a transaction sequence data structure 500 for a client is illustrated in FIG. 5.

Transaction sequence data structure 500 may include information about a client's purchase transaction history, for example a date or day number (illustrated as "Day #" in FIG. 5), identification of a merchant at which a purchase transaction took place on that date (illustrated as "Merchant ID(s)" in FIG. 5), and an associated purchase amount (illustrated as "Purchase Amount" in FIG. 5). As seen in FIG. 5, for example, data structure 500 may store data that on Day # "0", at Merchant ID "Walmart-123", a Purchase Amount of "$123.45" was transacted. It will be appreciated that in some embodiments, each transaction in a data structure may be represented in a separate row, for example. Other suitable data structures may be used.

In some embodiments, transaction data received from raw data 300 and stored in transaction sequence data structure 500 may include stock keeping unit (SKU) data for one or more purchase transactions, identifying, for example, the price, product options and manufacturer associated with a product subject to the transaction.

Other transaction data may include time of transaction, geographical location, and the like.

After creating structured sequence data structure 500, at block S430, processing device(s) 204 may encode merchant identifications to a multi-hot encoded vector.

At block S440, purchases or transactions in data structure 500 may be identified and labeled, for example, to a purchase category. Labelling transactions, for example, when a client has or has not purchased a car based on transaction history in data structure 500, may be used for training to allow for deep learning models to learn from example.

In some embodiments, a transaction may be labelled by inference based on merchant data that was received. For example, a particular transaction may be inferred based on the merchant location and price value of the transaction, to infer further details of the transaction, for example, what product was purchased and can thus be labelled.

In some embodiments, labelling may be done through data mining, automated, or by a heuristic, for example, to identify product in a transaction on the basis of the merchant and the transaction amount. By way of example, it may be determined that an individual who spends $40,000 at a car dealership has likely purchased a vehicle, and not branded car dealership merchandise.

In some embodiments, pre-labeled data may be provided from which further labelling may be extrapolated. In some embodiments, an amount spent on regular payments may be projected back to original payment and infer that was when a purchase was made.

As such, labelling may be performed by way of one or more of a supervised learning approach, unsupervised learning, or a sequence to sequence technique.

Figure 6:
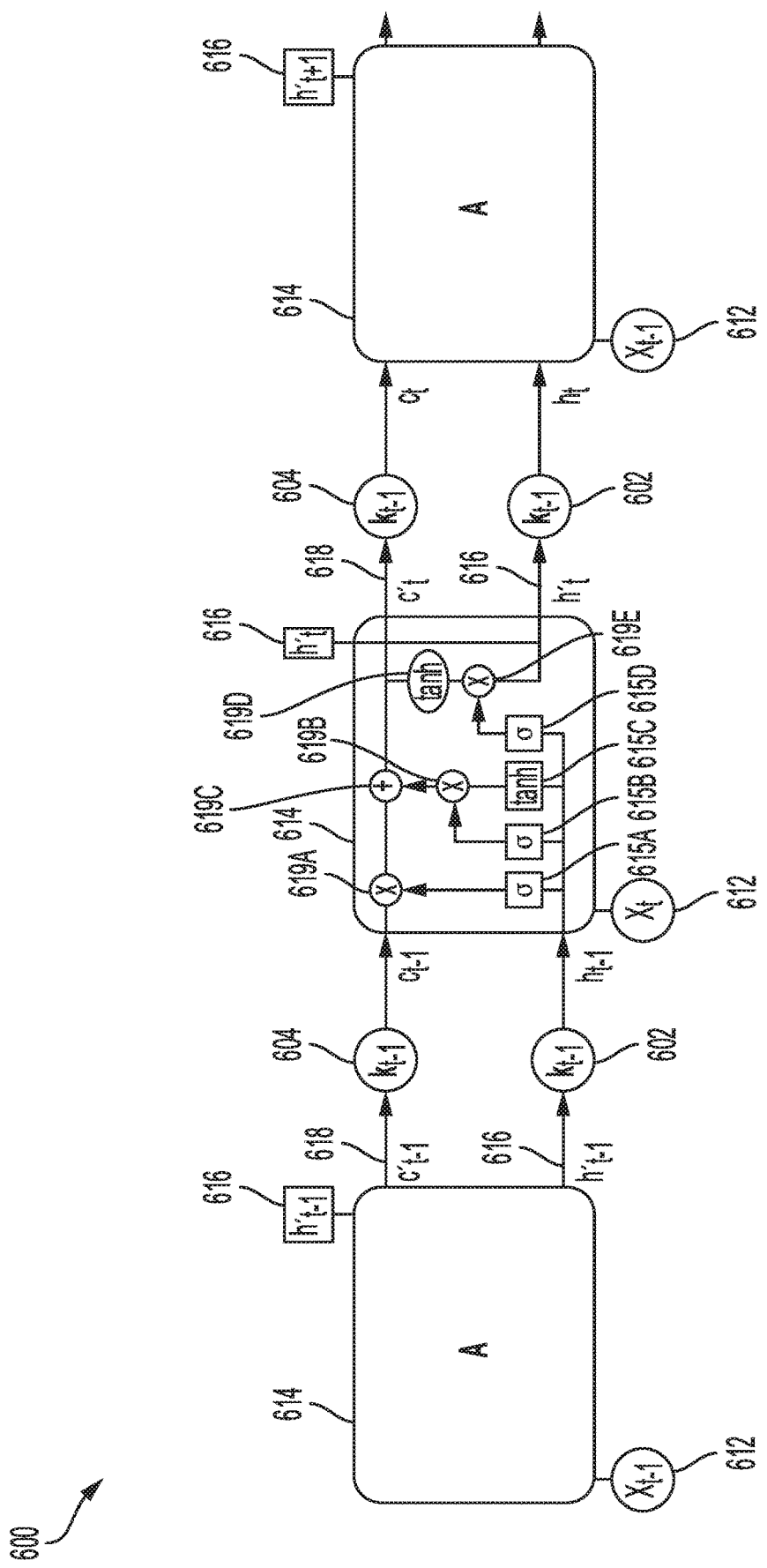
FIG. 6 is a schematic block diagram of a k-LSTM variation of LSTM, according to an embodiment.

At block S450, data structure 500 may be fed into a recurrent neural network, for example a parameterized k-LSTM architecture 600, as shown in FIG. 6. Training may be, for example, from labeled data in data structure 500 and client input sequences. A k-LSTM model may then be trained using suitable neural network based training methods, and optimized using an optimization procedure such as gradient descent.

Once a k-LSTM model is trained, it may be stored at block S460, for example in database(s) 216, and may be used to provide inference for purchase prediction, for example, on new clients who are waiting to be scored on their likelihood to buy a vehicle, a home, a vacation, or the like, and thus predicts the likelihood of various upcoming transactions.

It should be understood that one or more of the blocks may be performed in a different sequence or in an interleaved or iterative manner.

A k-LSTM model, according to an embodiment, will now be described in further detail with reference to FIG. 6. FIG. 6 is a schematic block diagram of a k-LSTM variation of LSTM, for machine learning purchasing forecasting implemented by system 100.

In the example shown in FIG. 6, $X_t$ is sequence input 612 for a time t into a repeating module 614, labeled A as shown in FIG. 6. $h_t$ is sequence hidden state 616 for time t (also the network output), $c_t$ is sequence cell state 618 for time t, and a and tan h are non-linear transformations within module 614.

As seen in FIG. 6, module 614 contains four interacting neural network layers 615A, 615B, 615C, 615D. Module 614 also includes multiplication, addition and tan h pointwise operations such as operations 619A, 619B, 619C, 619D, and 619E.

In some embodiments, the non-linear transformations and pointwise operations within module 614 are the same as the non-linear transformations and pointwise operations within module 14, as described herein.

As shown in FIG. 6, parameterized k-LSTM architecture 600 includes hidden states 616 and cell states 618 being passed through kronos gates 602, 604 that are parameterized by k, which acts as a toggle to preserve existing memory from previous time step or update memory with current inputs.

The parameterized k-LSTM architecture 600 disclosed herein is an adaption of LSTM that includes additional kronos gates 602 to update hidden states, and additional kronos gates 604 to update cell states. Two embodiments of a k function are described in further detail, below. Other adaptations of LSTM include a phased LSTM model, which proposes a periodic k function, for example, as detailed in Neil D., Pfeiffer M., Liu S. C. (2016), *Phased lstm: accelerating recurrent network training for long or event-based sequences,* arXiv.org, which is incorporated herein by reference.

In some embodiments, variant k may be a constant between [0,1] over time t. In a forward-feed operation:

$$h_t = k \odot h'_t + (1-k) \odot h_{t-1} \qquad \text{(Equation 1)}$$

$$c_t = k \odot c'_t + (1-k) \odot c_{t-1} \qquad \text{(Equation 2)}$$

In Equation 1, a kronos gate, by way of element-wise multiplication (represented by the symbol "⊙") takes the weighted average of the recently updated hidden state $h'_t$ and the previous hidden state $h_{t-1}$ to generate the current hidden state $h_t$. Equation 1 may be implemented, for example, in kronos gate 602 as shown in FIG. 6.

Equation 2 follows the same approach in updating the cell state. Equation 2 may be implemented, for example, in kronos gate 604 as shown in FIG. 6.

During back propagation, k constants for all the hidden units are updated through all gradient descent based optimizers.

Equation 1 and Equation 2 may lead to the following properties: when k is near zero, the current hidden/cell state is going to primarily preserve the previous time hidden/cell state and minimally update it based on the current input. When k is near 1, the hidden/cell state updates much like the traditional LSTM. When utilizing a k-LSTM model with many neurons, some of the neurons will train to have lower k values approaching zero and update slower with lower frequency. Other neurons will train towards k values of one and updates their state more frequently and aggressively. This balance between these low frequency and high frequency neurons may allow the architecture to maintain long memory states as well as consume recent inputs that can contribute to better predictions.

In some embodiments, a parameterized k-LSTM architecture may allow for further expression given to the kronos gate as a function of time. In some embodiments, parameter k may be defined by the following function in general:

$$k = f(x_t, h_{t-1}, t) \qquad \text{(Equation 3)}$$

Based on Equation 3, k is now not a constant but can modulate based on the various inputs. k may remain low for long periods during a sequence preserving its existing memory, and dynamically scale to larger values when scenario is preferable to update memory with current inputs. One such proposal for this function of k is itself a neural network.

Figure 7:
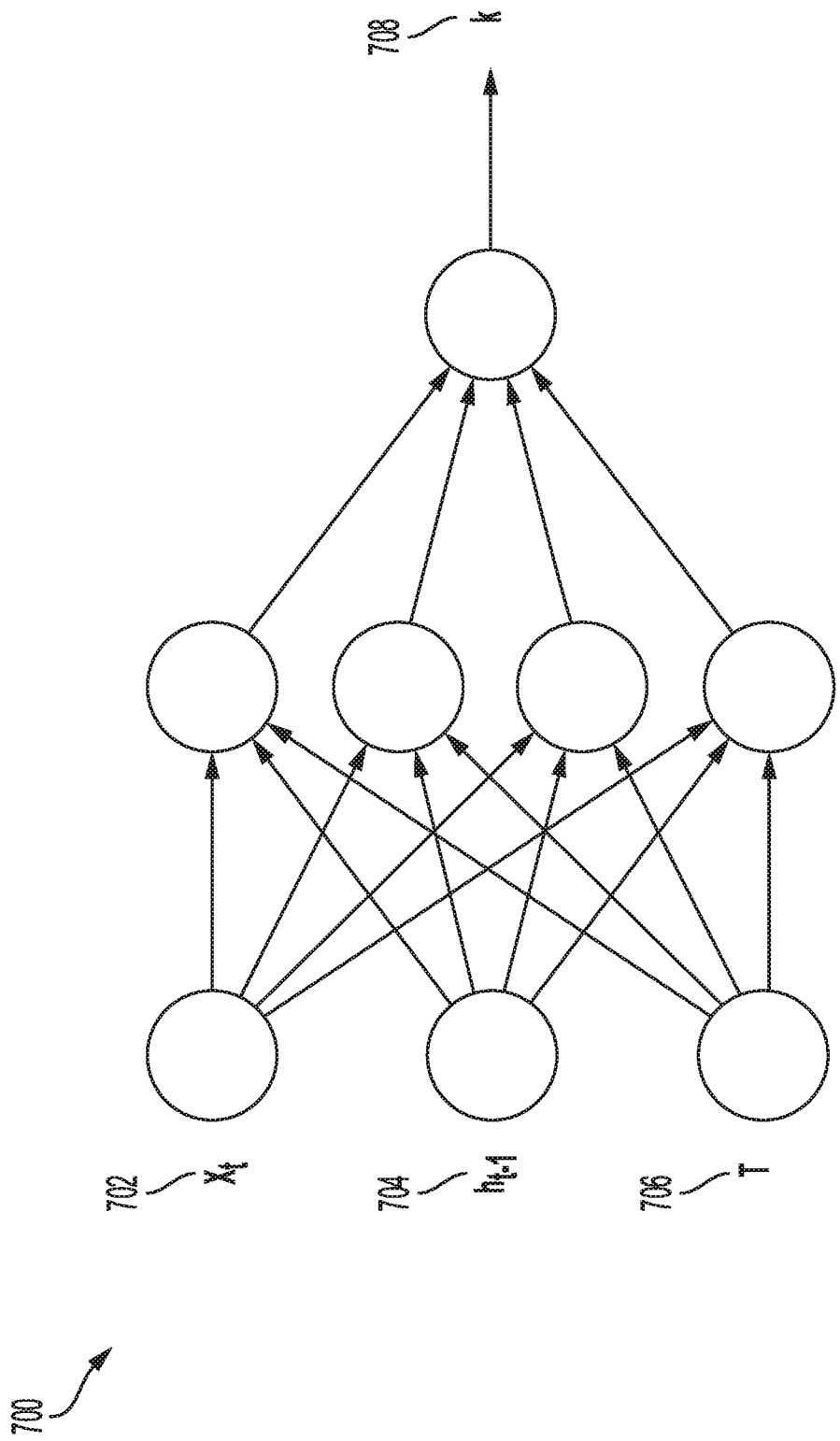
FIG. 7 is a schematic diagram of architecture for a kronos gate parameter, according to an embodiment.

An example of an architecture for the function of k used in a kronos gate as a neural network 700 is shown in FIG. 7. As shown in FIG. 7, in some embodiments, the input 702 into neural network 700 is the current input 702 ($x_t$), previous hidden state 704 ($h_{t-1}$), and a value of time 706 (T), for example, a current or actual value of time, and the output is the k-value 708 (k) constrained between [0,1]. In some embodiments, one or more of, inputs 702, hidden state 704, and time 706 may correspond to input 612, hidden state 616 and time t as provided in k-LSTM architecture 600 and shown in FIG. 6. In some embodiments, time T 706 may correspond to the time represented by time index t.

In some embodiments, time features can also be created to give additional expressiveness. Time features can be expanded to use, for example: absolute time; relative time; difference between current and previous times; and time represented in Fourier basis to capture periodic behaviour.

Conveniently, the use of kronos gates as described herein may modulate the cell and hidden states. The k value for a given time t, may be the same acting on both cell and hidden state. The kronos gates may thus modulate the behaviour of a model. A traditional LSTM model will forget and have memory leaking, and as the number of sequences increases, the likelihood of retain information from start is small. The present model may address some of these issue by only taking in information at discrete intervals. The model may optimizing the inputs by taking in fewer and better inputs and avoiding noise and junk.

In some embodiments, k-LSTM and parameterized k-LSTM may be used to provide targeted and relevant campaigns, for example, advertising campaigns, to individuals (for e.g., clients or users) who would otherwise find campaigns an annoyance. Furthermore, the methodology of capturing long input sequence with k-LSTM and parameterized k-LSTM may be applied to many time-series and forecasting problems.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references may be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

Of course, the above described embodiments are intended to be illustrative only and in no way limiting. The described embodiments are susceptible to many modifications of form, arrangement of parts, details and order of operation. The invention is intended to encompass all such modification within its scope, as defined by the claims.

What is claimed is:

1. A computer system for preserving long-term memory of a machine learning architecture, the system comprising:
a processor;
a memory in communication with the processor, the memory storing instructions that, when executed by the processor cause the processor to:
receive event data associated with a series of events occurring over a period of time;
create structured data based on the event data;
identify events in the structured data that are associated with an event category;
label the events associated with the event category;
instantiate or access from the memory a recurrent neural network (RNN) architecture comprising:
a series of nodes, each node in the series of nodes including a plurality of neural network layers for storing a hidden state and a cell state; and
a pair of kronos gates between each pair of sequential nodes in the series of nodes, the pair of kronos gates configured to toggle between preserving a current hidden or cell state and updating the hidden or cell state based on at least one parameterized input;
train the recurrent neural network with the structured data and the labels; wherein training the RNN includes:
based on a toggling of a first kronos gate of the corresponding pair of kronos gates, updating a hidden state for a current time node in the series of nodes, based on a weighted average of the hidden state at a previous time node and the hidden state at the current time node;
based on a toggling of a second kronos gate of the corresponding pair of kronos gates, updating a cell state for the current time node in the RNN architecture, based on a weighted average of the cell state of a previous time mode and the cell state of the current time mode;
store the RNN architecture including the updated hidden state and the updated cell state; and
input to the RNN architecture data representing a second series of events to generate output data for communicating a likelihood of a subsequent occurrence of an event associated with the event category.

2. The computer system of claim 1, wherein the RNN architecture comprises a long short-term memory architecture.

3. The computer system of claim 1, wherein the RNN architecture is configured to update the weighted average of the hidden state at the previous time node and the hidden state at the current time node based on a constant value over time.

4. The computer system of claim 1, wherein the RNN architecture is configured to update the weighted average of the cell state at the previous time node and the cell state at the current time node based on a constant value over time.

5. The computer system of claim 1, wherein the RNN architecture is configured to update the weighted average of the hidden state at the previous time node and the hidden state at the current time node and the weighted average of the cell state at the previous time node and the cell state at the current time node based on a same constant value over time.

6. The computer system of claim 1, wherein the RNN architecture is configured to update the weighted average of the hidden state at the previous time node and the hidden state at the current time node and the weighted average of the cell state at the previous time node and the cell state at the current time node using a same neural network.

7. The computer system of claim 6, wherein the same neural network comprises an architecture based at least in part on the current input, the previous hidden state, and time features.

8. The computer system of claim 1, wherein the event category is a vehicle purchase.

9. The computer system of claim 1, wherein the event data includes transaction events.

* * * * *